United States Patent [19]

Schloemer

[11] Patent Number: 4,965,850
[45] Date of Patent: Oct. 23, 1990

[54] SYSTEM FOR AND METHOD OF ASSIGNING FREQUENCIES IN A COMMUNICATIONS SYSTEM WITH NO CENTRAL CONTROL OF FREQUENCY ALLOCATION

[76] Inventor: Jerry R. Schloemer, Edwards Subdivision, P.O. Box 307, Round Lake, Ill. 60073

[21] Appl. No.: 299,625

[22] Filed: Jan. 23, 1989

[51] Int. Cl.$^5$ ............................................. H04Q 7/00
[52] U.S. Cl. ........................................ 455/33; 455/34; 455/67
[58] Field of Search .................. 455/33, 34, 54, 56, 455/67; 379/59, 60, 63

[56] References Cited

U.S. PATENT DOCUMENTS

| | | | |
|---|---|---|---|
| 4,670,906 | 6/1987 | Mio | 455/56 |
| 4,723,266 | 2/1988 | Perry | 455/33 |
| 4,736,453 | 4/1988 | Schloemer | 455/33 |
| 4,765,753 | 8/1988 | Schmidt | 455/33 |
| 4,794,635 | 12/1988 | Hess | 455/33 |

*Primary Examiner*—Reinhard J. Eisenzopf
*Assistant Examiner*—Curtis Kuntz
*Attorney, Agent, or Firm*—Leo J. Aubel

[57] ABSTRACT

A system for and method of assigning frequencies in a mobile telephone communication system wherein there is no central control of frequency channel allocations and wherein such assignment is made by real time signal comparisons without reference to geographical patterns.

7 Claims, 2 Drawing Sheets

SYSTEM FOR AND METHOD OF ASSIGNING FREQUENCIES IN A COMMUNICATIONS SYSTEM WITH NO CENTRAL CONTROL OF FREQUENCY ALLOCATION

GENERAL BACKGROUND

In order to achieve better use of the limited frequency resource, cellular mobile telephone systems have a planned reuse pattern for the frequencies. Cellular systems and other radio telephone systems have relied on geographic patterns that guarantee adequate geographical separation of users which wish to use the same frequency. Another method whereby assignments can be made solely on signal strength without reference to geographic separations and geographic patterns is shown in U.S. Pat. No. 4,736,453. In the approach disclosed in U.S. Pat. No. 4,736,453 and in other cellular systems, a central computer and voting system receivers are used to make calculations to determine how the frequencies will be assigned.

It would thus be desirable to have an approach that eliminates the dependency on fixed geographic patterns that could be made practical without a central frequency allocation computer. The requirement for a central frequency allocation computer would be eliminated and mobile and the local base site would make the necessary frequency channel assignments.

SUMMARY OF THE INVENTION

The present invention is directed to a system for and method of assigning frequencies in a radio telephone system without central frequency assignment computer control that is not dependent upon a geographical pattern of frequency assignments, and that will yield a greater utilization of the radio spectrum with less probability of interference.

While the present invention will be described with reference to cellular systems, those skilled in the art will recognize that this approach also has merit in other communication systems. One such system involves so called rural radio or line extender systems comprising systems installed in areas where land line telephones can not be economically installed. Such systems use radio links to extend the land lines. The present approach also has merit in systems for communications with airplanes and satellites.

Further, those skilled in the art will recognize that this approach can be improved thru the use of patterns of directional antennas in a manner similiar to the improvements in existing cellular.

Further, while the present invention is described with conventional FM narrow band channels, those versed in the art will understand that the invention has application in the various digital modulation schemes that are currently being proposed for cellular systems.

DRAWINGS

The foregoing features and advantages of the present invention will be apparent from the following more particular description of the invention. The accompanying drawings, listed hereinbelow, are useful in explaining the invention.

FIGS. 1, 2, 3, 4, 5, 6, 7, and 8 are sketches useful in explaining the inventive method.

DETAILED DESCRIPTION OF THE INVENTION

Figure 1:
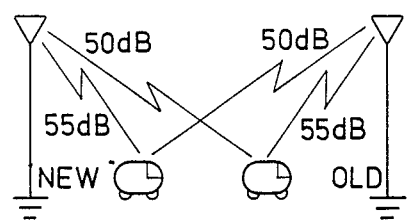

Certain proposed cellular radio telephone systems, which do not employ a central computer controlling frequency assignment, comprise various base sites and multiple mobile units. Each base site broadcasts a message on its available frequencies. A mobile telephone user (mobile) desiring comunications listens and searches for a channel with a message, and then captures that channel at that base site (base), and removes that frequency at that base from the list of available frequencies. Much of the line extender equipment in the market place captures a channel in this manner.

It should be noted that his approach can only be employed if available system frequencies are carefully chosen in advance such that other systems with users on the same frequency will have adequate geographical distance between them to insure that they will not interfere with each other. In the such systems the base talk out channels are preassigned in pairs with the mobile talk back channels.

In the present inventive system, the message stating that a frequency is available is not a continuous transmission, but a timed transmission such that the base sites transmit their available channels at different times.

Each base site receiver that is already involved in a conversation will use conventional voting receivers to measure the signal strength received at the base site in a manner similar to today's cellular system. The technology of voting receivers that accurately measure signal strengths are described in a number of U.S. Pat. Nos. such as 3,819,872; 4,435,840; 4,485,486; 4,144,411; and 4,144,496. Each base site will add a tone to its audio transmission corresponding to the strength of the received signal. For example, if the received signal is 0 to 10 dB over threshold a 100 cps tone signal is added. The following table shows how the tones are added to the signal:

| Signal Strength | Frequency of Tone |
| --- | --- |
| 0 to 10 dB | 100 |
| 10 to 20 dB | 120 |
| 20 to 30 dB | 140 |
| 30 to 40 dB | 160 |
| 40 to 50 dB | 180 |
| 50 to 60 dB | 200 |
| 60 to 70 dB | 220 |
| 70 to 80 dB | 240 |
| 80 to 90 dB | 260 |

This tone signal is selected so that it is not objectionable to the user's voice conversation. The tone signal may also comprise added characters in the computer data streams.

The mobile receiver in the conversation receives the same signal strength as the base site due to reciprocity of propagation. Consequently, the mobile merely transponds (copies) the tone signal and adds it to its audio transmission.

In the present invention, before adding a new mobile to the system, which already has conversing mobiles, four tests are made to insure that interference is not being created.

(Test A) Will the new mobile's base site cause interference at a previously assigned mobile?

(Test B) Will the new mobile be interfered with by a previously assigned base site?

(Test C) Will the new base site be interfered with by a previously assigned mobile?

(Test D) Will the new mobile cause interference at a previously assigned base site?

It is known that FM narrow band and proposed digital modulations schemes normally require a difference of 12 dB to 18 dB between desired and undesired signal strengths on the same channel in order to have interference free communications. A safety factor of 18 dB can be added to this 12 dB number to give a total of 30 dB. Consequently, if the desired signal is 30 dB stronger than the undesired signal, good communications can occur. Naturally, this 18 dB safety factor can be increased during periods of light loading and decreased during periods of heavy loading.

This evaluation is performed using actual signal strengths present in the system. By using actual signal strengths present, the system will perform well in areas with hills, valleys, buildings, and other anomolies that cause unusual signal strength perturbations. Note that calculations are performed without a central computer.

The procedure for performing these evaluations is as follows and frequency assignment is made without a central assignment computer:

The base sites are continuously monitoring the various signal pairs and searching for channels that appear to be open. The base sites only transmit messages on those channels where its transmissions would not bother an existing mobile receiver. This is accomplished by monitoring the strongest signal received on a tentative channel pair and sensing the tone signal present in that transmission. The base site measures the signal strength on the proposed channel and also measures the frequency of the tone. The base site then calculates whether its transmission would interfere with the previously assigned mobiles that are on the air. If the base site would interfere, it does not transmit on that tentative channel, and no mobiles will attempt to use or seize that channel. This is test A above.

The new mobile searches through the available spectrum, and locks on to a strong available transmission. This will tentatively become the new channel at the new base site. Then the new mobile listens, in the quiet time, to the existing conversations, if any, that are present on the proposed channel, and compares their signal strengths to the previously noted signal strength from its proposed base. In order to avoid expensive signal measurement technology in the mobile, this one test is perfomed by noting the amount of gain in the AGC circuit. It is noted that this test need not be performed with a great degree of accuracy, and that the most important measurement is whether the mobile actually hears a strong conversation that could cause its receiver a problem. If the mobile does not have a good desired signal to undesired signal ratio, the mobile than commences to scan and search the channels for another tentative channel. This is test B above.

The mobile then signals the proposed base site on a separate common signalling channel that it is interested in using that channel at that site. The base site then measures the signal strength of the new mobile, and records that signal strength. The new base site then compares the signal strength of the incoming new mobile on the common channel with the strongest user on the proposed channel. The base computer can calculate, if the previously assigned mobile would interfere with the new mobile at the proposed base site receiver. If interference would occur, the base site then signals the new mobile on the signalling channel that this channel is not available. This is test C above.

When the proposed mobile signals its proposed base site on the common signalling channel and indicates which channel pair it desires to use, non-involved base sites listen to this signalling and measure the signal strength of the new mobile. Each of the non-involved base sites can calculate if the new mobile would interfere at its base receivers with an existing conversation. If interference would occur, the previously assigned base site signals the new mobile that this channel is not available, and the mobile commences to continue to scan the spectrum. This is test D above.

The following series of cases demonstrate the following:

(1) The methodology of making inteference free assignments, without a central computer, using signal strengths and tones.

(2) That the current geographical separation criteria of present cellular systems is not precise and is not efficient.

(3) The prior art practice of monitoring at a new proposed base site to determine if a channel is occupied is not accurate, and frequently leads to the wrong decision.

(4) That the technology of making the indicated four tests of the present invention is a much more efficient and accurate method for determining if frequencies can be reused.

Assume the following propagation table. This can be considered an example of a 50 foot base site antennae height, and a mobile antennae height of 5 feet. Distances are given in miles from the desired, or undesired, base site to the mobile. Signal strength received is given in Dbs over threshold. Obviously, the following table is only examplary, as heights of trees, buildings, valleys, foilage density, etc. all contribute to make different specific relations.

| | | |
|---|---|---|
| 1 Mile | 90 dB | (Almost line of sight) |
| 4 Miles | 55 dB | (Minor obstructions) |
| 6 Miles | 50 dB | (Minor obstructions) |
| 11 Miles | 20 dB | (Curvature of earth and obstructions) |
| 14 Miles | 0 dB | (Curvature of earth) |

In these case examples, it is assumed that 30 dB between desired and undesired signal is needed for adequate safe co-channel frequency reuse. It is important to note that in conventional geographic cellular theory that two base sites located exactly 10 miles apart are too close together for typical frequency reuse. All eight case examples have 10 miles between the base sites.

CASE I

In this case, depicted in FIG. 1, the two base sites are 10 miles apart, and the two mobiles are between the base sites. Each mobile is 4 miles from the desired base site. The old assigned mobile is on the right, and the new proposed assignment is on the left.

Because the previously assigned base is receiving a signal of 55 dB over threshold, it has created an audio tone of 200 cps and added that in its audio transmission. The previously assigned mobile has transponded this 200 cps tone so the tone is also present in the mobile's transmission. Now, when the new base monitors this channel it will sense a signal of 50 dB over threshold from the old mobile, and on that same channel sense the audio tone from the old mobile of 200 cps. The new base then calculates that if it would transmit on this particular channel, it would interfere with the old mobile. The old mobile's desired signal is between 50 and 60 dB over threshold as deduced by the audio tone, and the old mobile's potential undesired signal deduced by reciprocity from the 50 dB signal received at the potential new base is 50 dB over threshold. The difference between these two signals at the old mobile is only 5 dB and not sufficient for frequency reuse. Consequently, test A fails, and the new base will not suggest that channel as being available. Co-channel use is not possible.

In this particular case, all four tests would ultimately fail, and co-channel use is not possible. Also, monitoring by the new base would hear the old mobile and conclude the channel was occupied, and conclude correctly that reuse of a frequency is not possible.

CASE 2

Figure 2:
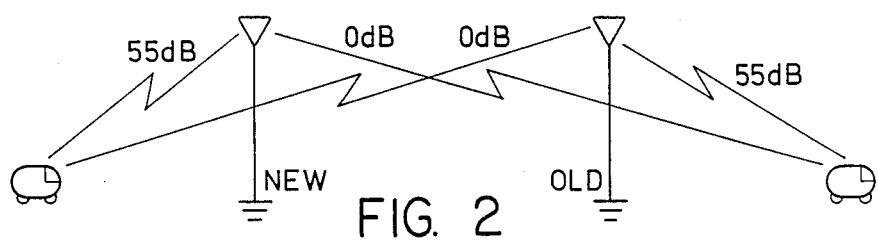

In this case, depicted in FIG. 2, the mobiles are on opposite sides of their base sites, and they are each four miles from their base sites. The new mobile is on the left.

In this case, the new base would hear a quiet channel, and would pass test A. Next, the new mobile would not hear any signals during the quiet time, and would pass test B. Next, the new base would measure the signal strength of the new mobile and compare it to a quiet channel and would pass test C. Lastly, no other base would hear the signalling by the mobile, and test D would pass.

In this particular case, all four tests pass, and co-channel use is possible. Also, in the case, monitoring by the new base would hear a quiet channel, and would permit reuse.

CASE 3

Figure 3:
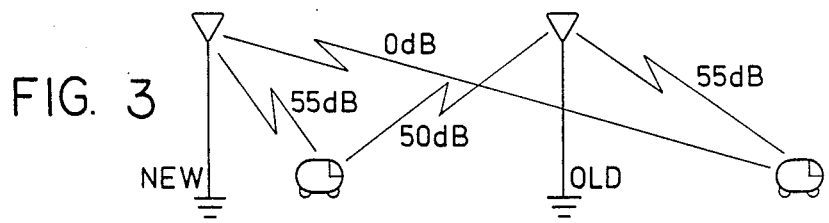

In this case, depicted in FIG. 3, the old mobile is 4 miles beyond the old base, and the new mobile is between the bases, and is four miles from the potential new base.

In this case, the new base would hear a quiet channel and test A would pass. Also, the proposed mobile would hear a strong signal as noted by the AGC circuit during the quiet time; test B would fail, and reuse would not be attempted.

Note, test B and test D fail, and the new mobile would interfere at the old base site receiver. Also, the new mobile would be interefered with by the old base transmitter. Co-channel use is not possible. However, monitoring by the new base would hear an open channel, and selection by prior art technology would result in a mistake.

CASE 4

Figure 4:
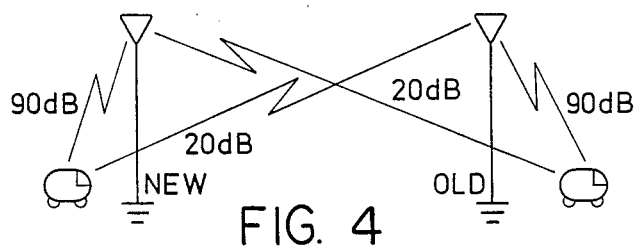

In this case, depicted in FIG. 4, both mobiles are on opposite sides of their bases, but they are only one mile away from their respective bases.

In this case, the old base has added an audio tone of 260 cps to its signal, and the mobile has transponded the tone. The proposed base measures an incoming signal strength of 20 dB and notes the audio tone of 260 cps. The new base calculates that its transmission by reciprocity at the old mobile would be only 20 dB over threshold, and that the old mobile has a desired signal of 90 dB as deduced from the audio tone, and the new base concludes that it would not affect the old mobile, and test A passes.

The new mobile senses that the proposed desired signal is 90 dB over threshold by means of its AGC (automatic gain control) circuit, and that during the quiet time the undesired signal is only 20 dB over threshold, so that the new mobile concludes it would not be affected, accordingly, test B passes.

The new mobile then signals the proposed base on the signalling channel, and the new base measures that signal strength of 90 dB over threshold and compares that to the undesired signal on the proposed channel of only 20 dB, and the new base concludes that it would not be affected and test C passes.

The old base site while monitoring the common signalling channel senses that the undesired signal would only be 20 dB over threshold, and that it would not affect the strong 90 dB signal it is receiving, and it does not bar the new mobile. Test D passes, and reuse is possible.

In case 4, all four tests pass, and co-channel use is possible. In prior art systems, monitoring by the new base would sense the old mobile, and conclude that the channel is busy, and that reuse is not possible and thus would miss an opportunity for reuse and make a mistake.

CASE 5

Figure 5:
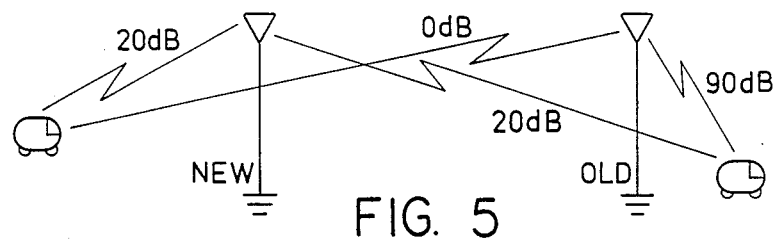

In this case, depicted in FIG. 5, the old mobile is beyond the old base by only 1 mile, and the new mobile is on the opposite side by 11 miles.

In this particular case, test A would pass because the new base would note the audio tone of 260 cps and deduce the old mobile has a desired signal of 90 dB over threshold, and the undesired signal by reciprocity of only 20 dB, and test A would pass.

The new mobile would hear a quiet channel in the quiet time, and test B would pass. The new base would compare the signal strength on the signalling channel from the proposed mobile (20 dB) with the undesired signal strength on the proposed channel and conclude that reuse is not possible, and test C would fail.

Only test C would fail, and co-channel use is not possible. Prior art systems would also get the correct answer in this case.

CASE 6

Figure 6:
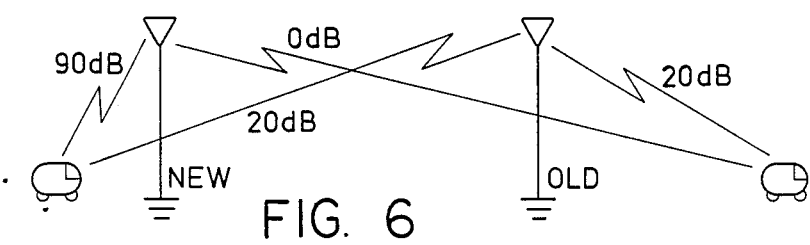

In this case, depicted in FIG. 6, the old mobile is 11 miles beyond its base, and the new proposed mobile is only one mile from its base on the opposite side.

In this case, the new base would hear a quiet channel, and suggest the channel, and test A would pass. The mobile's AGC circuit would indicate that reuse is possible, and test B would pass.

The new base sites would hear a quiet channel, and test C would pass.

However, the old base would hear the new mobile on the signalling channel and measure its strength at 20 dB. It would also know that it is hearing a weak desired signal of only 20 dB on that channel, and it would conclude that interference would occur, so the old base signals the new mobile that reuse is not possible and to attempt another channel. Test D fails, and co-channel use is not possible. Prior art monitoring technology would hear an open or quiet channel, and conclude reuse is possible and a mistake would result. A new mobile would interefere with old mobile at the old base site.

CASE 7

Figure 7:
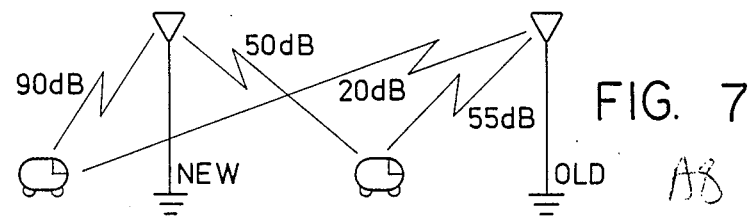

In this case, depicted in FIG. 7, the old mobile is four miles from its base site and is located between the two bases. The new proposed mobile is only one mile from its base.

In this case, the new mobile would hear a strong signal of 50 dB on the proposed channel, and would also sense the audio tone of 200 cps and conclude that reuse is not possible.

Test A fails, and co-channel use is not possible. In this example, prior art type of monitoring by the new base site would hear the old mobile and make the correct decision.

CASE 8

Figure 8:
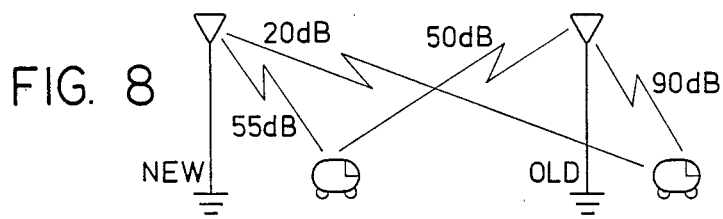

In this case, depicted in FIG. 8, the old mobile is only one mile beyond its base, and the new mobile is between the base sites, and is only four miles from the proposed base site.

In this case, the new base sites measure the signal strength of 20 dB from the old mobile, and also senses that the 260 cps tone that is present. The new base calculates that it would not interfere with the old mobile. Test A passes.

However, the new mobile would hear a strong signal as sensed by its AGC circuit during the quiet time, and it would conclude that it would be interfered with, and test B would fail.

In this case, test B fails, and co-channel use is not possible. Prior art monitoring would make a correct decision in this case, and not permit reuse.

These simple case examples were chosen in just a one dimensional system. Obviously, cases could have been chosen to take into account the two dimensional nature of mobiles moving around a geographical area. Complicated case examples involving buildings, hills, and various other propagation situations are also possible. However, the previous case examples show that either a constant distance between base sites, or channel monitoring before reuse are not very accurate or efficient criteria for making the reuse decision.

It must be noted that the hardware in the mobile is relatively inexpensive, and that these four tests are performed with a minimal amount of signalling. Thus the economic benefits of a series of base sites that operate without causing co-channel interference without a preplanned frequency allocation are enormous.

The prior art approach of just monitoring a channel at the base site and only offering that channel to the mobiles if it is not in use is not satisfactory. Some threshold level has to be chosen in advance. If the level chosen is too low or just above the noise level, than many opportunities are by-passed where the channel could have been reused without interference. That is because many distant conversations could be weakly heard, and the conservative low level would make it seem the channel is busy when in fact the frequency could have been reused. Consequently, a low threshold in such case, significantly reduces the potential for frequency reuse, and consequently reduces spectrum efficiency. However, if the threshold is too high, then assignments will be frequently be made that cause a failure of one of the four tests mentioned earlier, and communications are lost.

Thus, by merely avoiding those assignments that would cause interference, and not solving the complicated matrix equations described in U.S. Pat. No. 4,736,453, the present system and method realizes 90% to 93% increase in spectrum utilization. The inventive method presented herein which avoids interference situations offers the possibility of much more than a doubling of spectrum efficiency as compared to the prior art geographic cell approach.

Prior art cellular systems have improved capacity dramatically by clever patterns of directional antennaes. This new approach can be combined with the same patterns or other patterns to achieve greater utilization.

While the invention has been particularly shown and described with reference to a preferred embodiment thereof, it will be understood by those skilled in the art that various changes in form and details may be made therein without departing from the spirit and scope of the invention.

I claim:

1. In a communication system comprising a plurality of base sites comprising transmitter and receiver means and a plurality of mobiles comprising transmitter and receiver units which can be selectively operated on a plurality of frequency channels, a method of making frequency channel assignment of said mobiles to said base sites by real time signal comparisons without reference to a geographical pattern and without use of a central frequency assignment control said method consisting of conducting the following tests before making a frequency channel assignment to a new, that is to be assigned, mobile:
    a. determining whether signal transmissions from a new base site, that is the base site to which said new mobile is to be assigned will cause interference at a previously assigned mobile,
    b. determining whether said new mobile will be interfered with by signal transmissions from a previously assigned base site,
    c. determining whether said new base site will be interfered with by signal transmissions from a previously assigned mobile, and
    d. determining whether signal transmissions from said new mobile causes interference at a previously assigned base site; and, making said channel assignment.

2. A method as in claim 1 wherein said method consists of conducting at least three of the four determining steps recited in claim 1.

3. A method as in claim 1 wherein the real time signal comparison is of signal amplitudes.

4. A method as in claim 1 wherein communication between base sites pertaining to the assignment of channels is not required.

5. A communication system comprising
    (a) a plurality of base sites comprising transmission and receiver means,
    (b) a plurality of mobile transmission and receiver means which can be selectively operated on a plurality of frequency channels,
    (c) means for making frequency channel assignment of said mobile means by real time signal comparisons of transmissions without reference to a geographical pattern, and without reference to a central frequency assignment control,
    (d) means for determining whether the signal transmissions from a new base site, that is, a base site to which a new, that is a to be assigned mobile cause interference at a previously assigned mobile, (e) means for determining whether said new mobile will be interfered with by signal transmissions from a previously assigned base site, (f) means for determining whether said new base site will be interfered with by signal transmissions from a previously assigned mobile, and, (g) means for determining whether said new mobile signal transmissions cause interference at a previously assigned base site.

6. A system as in claim 5 wherein said system comprises at least three of said recited means for determining an operating conditon.

7. A system as in claim 5 wherein the means for making the real time signal comparison comprises means for making a comparison of signal amplitudes.

* * * * *